(12) United States Patent
Rathbun et al.

(10) Patent No.: US 7,600,633 B2
(45) Date of Patent: Oct. 13, 2009

(54) PIN ASSEMBLY FOR CONVEYOR CHAIN

(75) Inventors: Jonathan M. Rathbun, Comstock Park, MI (US); Wayne E. Schmidt, Spring Lake, MI (US); Charles C. Frost, Ada, MI (US)

(73) Assignee: Frost Links, Inc., Grand Rapids, MI (US)

( * ) Notice: Subject to any disclaimer, the term of this patent is extended or adjusted under 35 U.S.C. 154(b) by 191 days.

(21) Appl. No.: 11/602,792

(22) Filed: Nov. 21, 2006

(65) Prior Publication Data

US 2007/0184698 A1    Aug. 9, 2007

Related U.S. Application Data

(60) Provisional application No. 60/739,587, filed on Nov. 23, 2005.

(51) Int. Cl.
*B65G 17/06*    (2006.01)

(52) U.S. Cl. .................. 198/851; 198/850; 474/226; 474/227

(58) Field of Classification Search .......... 198/850–853; 193/35 J; 411/339, 315, 383; 474/230, 226–229
See application file for complete search history.

(56) References Cited

U.S. PATENT DOCUMENTS

| 323,715 | A | * | 8/1885 | Morton ................. 411/315 |
| 1,715,094 | A | * | 5/1929 | Meekins ................ 198/851 |
| 1,901,850 | A | * | 3/1933 | Shafer, Jr. ............... 198/687 |
| 1,996,586 | A | * | 4/1935 | Meyer ................. 198/840 |
| 2,059,063 | A | | 10/1936 | Tourville |
| 2,293,029 | A | | 8/1942 | Focke |
| 2,625,830 | A | | 1/1953 | Transeau |
| 3,160,024 | A | * | 12/1964 | Mojonnier ............. 198/850 |
| 3,377,962 | A | * | 4/1968 | Dehne ................. 104/172.4 |
| 3,379,072 | A | * | 4/1968 | Kuntzmann ............. 474/218 |
| 3,742,863 | A | | 7/1973 | Rosenberger |
| 3,748,674 | A | | 7/1973 | Powell et al. |
| 4,014,267 | A | * | 3/1977 | Fitch .................. 198/730 |
| 4,114,467 | A | | 9/1978 | Petershack |
| 4,140,025 | A | | 2/1979 | Lapeyre |
| 4,151,652 | A | | 5/1979 | Palma |
| 4,195,887 | A | | 4/1980 | Ruddell |

(Continued)

FOREIGN PATENT DOCUMENTS

GB        1061012       3/1967

*Primary Examiner*—Gene Crawford
*Assistant Examiner*—William R Harp
(74) *Attorney, Agent, or Firm*—Van Dyke, Gardner, Linn & Burkhart LLP (57) ABSTRACT

A pin assembly for a chain of a material handling system includes a pin element and an attachment element. The pin element includes a shaft portion, a head portion at an end of the shaft portion, and an attachment portion at an end of the shaft portion opposite the head portion. The attachment element is configured to attach to the attachment portion of the pin element, and is positionable at the attachment portion and is retainable thereto. The attachment element may comprise a second head portion to define an I-type pin assembly or may comprise a side link and pusher member construction or other element or member. A mounting extension may extend from the attachment portion for mounting an object to the pin assembly after the attachment is attached to the pin element.

22 Claims, 7 Drawing Sheets

U.S. PATENT DOCUMENTS

| | | | |
|---|---|---|---|
| 4,263,779 A * | 4/1981 | Petershack | 59/8 |
| 4,413,513 A | 11/1983 | Ross et al. | |
| 4,493,680 A | 1/1985 | Hoffmann | |
| 4,986,798 A | 1/1991 | Van Rooij et al. | |
| 5,121,831 A | 6/1992 | Fesker | |
| 5,186,280 A | 2/1993 | Mattcheck | |
| 5,305,872 A | 4/1994 | Hutton | |
| 5,365,765 A | 11/1994 | Gohl et al. | |
| 5,378,205 A | 1/1995 | Gohl et al. | |
| 5,423,724 A | 6/1995 | Cole et al. | |
| 5,429,227 A * | 7/1995 | Krossmann et al. | 198/852 |
| 5,461,852 A | 10/1995 | Nagamatsu | |
| 5,482,154 A | 1/1996 | Affeldt et al. | |
| 5,490,590 A | 2/1996 | Courtney | |
| 5,492,215 A | 2/1996 | Affeldt et al. | |
| 5,563,392 A | 10/1996 | Brown et al. | |
| 5,606,915 A * | 3/1997 | Harris | 104/172.4 |
| 5,966,923 A | 10/1999 | Nakamura | |
| 6,098,787 A | 8/2000 | Murano | |
| 6,138,820 A | 10/2000 | Ewert | |
| 6,161,685 A | 12/2000 | Stebnicki | |
| 6,170,650 B1 * | 1/2001 | Morikiyo et al. | 198/867.14 |
| 6,241,080 B1 | 6/2001 | Tuomikoski | |
| 6,244,426 B1 | 6/2001 | Murano et al. | |
| 6,321,523 B1 | 11/2001 | Christmas | |
| 6,364,094 B1 | 4/2002 | Aistmar | |
| 6,419,078 B1 | 7/2002 | Leathers | |
| 6,474,464 B1 | 11/2002 | Horton et al. | |
| 6,691,862 B1 | 2/2004 | Mogens | |
| 6,746,353 B2 | 6/2004 | Albertin et al. | |
| 6,862,939 B2 | 3/2005 | Frost | |
| 6,991,094 B2 | 1/2006 | Frost | |
| 6,993,978 B2 | 2/2006 | Frost | |
| 7,059,032 B2 | 6/2006 | Lehner | |
| 7,246,699 B2 | 7/2007 | Frost et al. | |
| 2003/0168323 A1 * | 9/2003 | Frost | 198/852 |
| 2004/0244170 A1 * | 12/2004 | Lehner | 29/402.08 |
| 2005/0217531 A1 | 10/2005 | Waldmiller | |
| 2007/0114110 A1 | 5/2007 | Frost et al. | |
| 2007/0193860 A1 | 8/2007 | Frost et al. | |

* cited by examiner

PIN ASSEMBLY FOR CONVEYOR CHAIN

CROSS REFERENCE TO RELATED APPLICATION

The present application claims the benefit of U.S. provisional application, Ser. No. 60/739,587, filed Nov. 23, 2005, which is hereby incorporated herein by reference in its entirety.

FIELD OF THE INVENTION

The present invention relates generally to chains for a conveying system and, more particularly, to pins for chains and conveying systems that require at least some of the pins to mount or attach an object at one of the ends of the pin.

BACKGROUND OF THE INVENTION

Chains for power transmission or for material handling and processing systems, such as, for example, chains which function to move a plurality of trolleys or the like along a path in a processing plant, warehouse or the like, typically include multiple sections or links joined together by pins or bolts, such as I-pins. The links typically include a center link connected at each end to a pair of side links by a pin, such that the links move or pivot relative to one another about the pins as the chain travels along the desired path. It is often desirable for the chains to have pins with a substantially smooth surface (as compared to the surface of typical forged pins), in order to achieve enhanced performance and life cycles of the pins. Examples of such "smooth" pins are the pins commercially available in the Frost Smooth link and Frost Sani-link chains, manufactured and marketed by Frost Links, Inc. of Mich., and/or the pin types described in U.S. Pat. Nos. 5,365,765 and 5,378,205, which are hereby incorporated herein by reference.

In some applications, the chains or material handling systems require at least some of the pins to have a threaded end that extends longitudinally and past the head of the pin so as to provide a mounting portion for attaching an object to an end of the pin. Because such pins have a threaded portion extending past the head of the pin, they cannot be formed in the manner of the smooth link pins and the like. Rather, such pins must be forged as a unitary pin to achieve the desired form, and thus have a roughened surface and are less desirable and less suitable for some chain applications.

Therefore, there is a need in the art for a chain pin that overcomes the short comings of the prior art.

SUMMARY OF THE INVENTION

The present invention provides a pin assembly that has a pin element formed with a pin head or head portion at one end of a shaft portion and an attachment portion at the other end of the shaft portion. An attachment, such as a second pin head portion or a side link/pusher member or the like, is formed separately and is attached to the attachment portion to define the opposite end of the pin element (and optionally with an extension extending past the second head portion for mounting an accessory or object to the pin element). Because the pin element is formed without one of the heads of the pin, the pin element may be readily formed by a cold-forming process or other process that results in an exterior surface that has reduced surface irregularities to provide a substantially smooth pin surface (as compared to a roughened surface of a forged pin).

According to an aspect of the present invention, a pin assembly for a chain of a material handling system includes a pin element and an attachment. The pin element includes a shaft portion and a head portion at an end of the shaft portion. The pin element has an attachment portion at an end of the shaft portion opposite the head portion. The attachment is configured to attach to the attachment portion of the pin element. The attachment is positionable at the attachment portion and is retainable thereto, thereby defining an end of the pin element opposite the head portion.

Optionally, the attachment may comprise a second head portion, which is configured to be retained to the attachment portion of the pin element to define an I-type pin having opposite head portions. The pin element may include an extension extending longitudinally from the attachment portion, and the extension may protrude longitudinally from the second head portion when the second head portion is positioned at the attachment portion. The extension may include a mounting portion or element, such as a plurality of threads or the like, at or near an end of the extension for mounting an accessory or object to the pin element.

Optionally, the attachment may comprise a side link portion and pusher member portion. The side link portion may be configured to attach to the attachment portion of the pin element. The side link portion and pusher member portion may be unitarily formed.

The attachment may include a passageway formed therethrough, such that the attachment portion of the pin element is insertable through the passageway to position the attachment on the pin element. The pin element may include at least one retaining element formed at the attachment portion for retaining the attachment at the pin element. The retaining element may comprise a plurality of ridges or knurls on the exterior surface of the attachment portion, whereby the attachment may be press fit over and around the attachment portion at the knurls to substantially retain the attachment on the attachment portion.

The pin element and/or the attachment is/are preferably formed with reduced surface irregularities as compared to a forged pin. For example, the pin element and/or the attachment may be formed via separate cold forming processes or the like.

According to another aspect of the present invention, a method of forming a pin assembly for a chain of a material handling system includes forming a pin element. The pin element comprises a shaft portion and a head portion at a first end of the shaft portion. The pin element includes an attachment portion at a second end of the shaft portion opposite the first end. An attachment (such as an attachment formed or configured in the general shape of a head portion of the pin) is formed, such as with a passageway therethrough, so as to be configured to attach to the attachment portion of the pin element. The attachment portion of the pin element is attached to the attachment, such as by inserting the attachment portion at least partially through the passageway of the attachment, and the attachment is retained at the attachment portion of the pin element.

Therefore, the present invention provides a pin assembly with an attachment portion at an end of the shaft of the pin element. The separately formed attachment or head portion may be attached to the attachment portion of the pin element. For example, a second head portion may be attached to the attachment portion to form an I-pin, while an extension may extend through the second head portion and may provide a mounting element (such as a threaded end of the pin) for attaching an object or accessory to the pin assembly. Optionally, a side link and pusher member may be attached to the attachment portion to assemble the side link to the pin element. The pin element and/or attachment may have substantially smooth surfaces as compared to forged pins, such as may be achieved by cold forming of the pin element separate from the attachment (which may also be cold-formed or otherwise formed via a separate forming process from that of the pin element). The two-piece construction of the pin assembly of the present invention thus allows the pin assembly to be formed with substantially smooth components and structurally enhanced components as compared to conventional forgings.

These and other objects, advantages, purposes and features of the present invention will become apparent upon review of the following specification in conjunction with the drawings.

DESCRIPTION OF THE PREFERRED EMBODIMENTS

Referring now to the drawings and the illustrative embodiments depicted therein, a pin assembly 10 for a chain or section of chain for conveying product along a conveying system, such as for material handling or processing systems or the like, includes a pin body or body portion or pin element 12 and an attachment or attachment element, such as a head portion or element 14 (FIGS. 1-12). Pin element 12 includes a shaft portion 16, a pin head or head element or portion 18 at an end of the shaft portion 16, and an attachment portion 19 at the other end of the shaft portion. Pin element 12 also includes an extension or extension member or portion 20 extending from the attachment portion 19 at the end of the shaft portion 16. Pin element 12 is formed separately from head element 14, and head element 14 is positioned on pin element 12 to assemble the pin assembly 10, as discussed below. Pin element 12 and/or head element 14 may be formed to have reduced surface irregularities, such as via a cold forming process or the like, so that the exterior surfaces of the pin element 12 and/or head element 14 may be substantially smooth as compared to the roughened surfaces of conventional forged pins.

In the illustrated embodiment of FIGS. 1-4, pin assembly 10 comprises an I-type pin with opposite head portions or elements 14, 18 (when head element 14 is attached to attachment portion 19 of pin element 12) for engaging side links of a section of chain while the shaft portion (between the head elements 14, 18) engages a center link of the section of chain to retain the chain links together and to allow the chain to bend as it travels along the conveying path (such as is known in the conveying arts). Although the chain links are not shown in the drawings, the chain links may comprise any type of side and center links for a chain of a material handling system. For example, the side and center links may comprise chain links such as the types commercially available in the Frost Smooth link and Frost Sani-link chains, manufactured and marketed by Frost Links, Inc. of Mich., or may be formed utilizing the principles described in U.S. patent application Ser. No. 10/383,825, filed Mar. 7, 2003 by Frost for CONVEYOR CHAIN, now U.S. Pat. No. 6,991,094; and/or Ser. No. 10/969,825, filed Oct. 21, 2004 by Frost et al. for CONVEYOR CHAIN, now U.S. Pat. No. 7,246,699, which are hereby incorporated herein by reference in their entireties.

The side links and/or center links may comprise forged or stamped links, or may be processed or formed via any processing or forming means, without affecting the scope of the present invention. The conveyor chain includes multiple links or linkages connected together in a continuous loop about a conveying system, as is known in the art. For ease of description, only one pin assembly for a section or set of linkages of the chain is shown and described herein, while at least some of the other pin assemblies of the section of chain may be substantially the same as the pin assembly shown and described herein.

Figure 1:
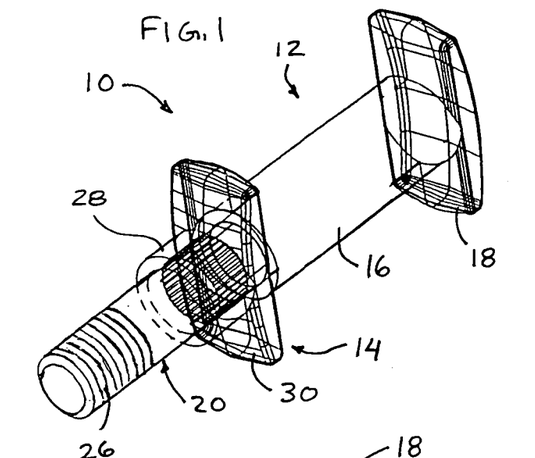
FIG. 1 is a perspective view of a pin assembly in accordance with the present invention.
Figure 2:
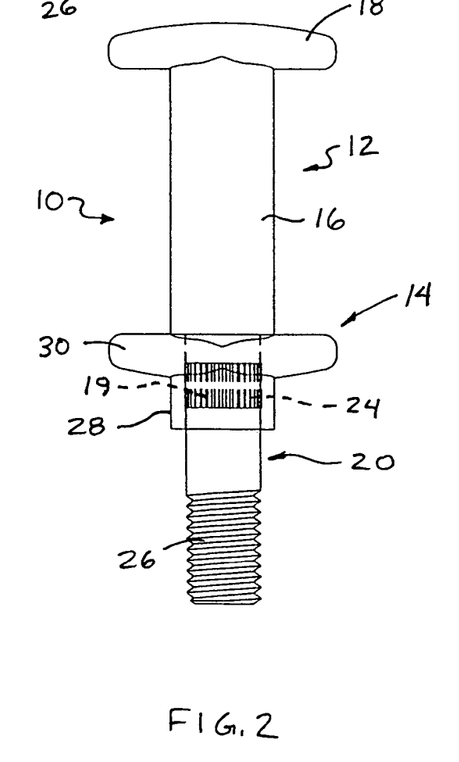
FIG. 2 is a side elevation of the pin assembly of FIG. 2.
Figure 3:
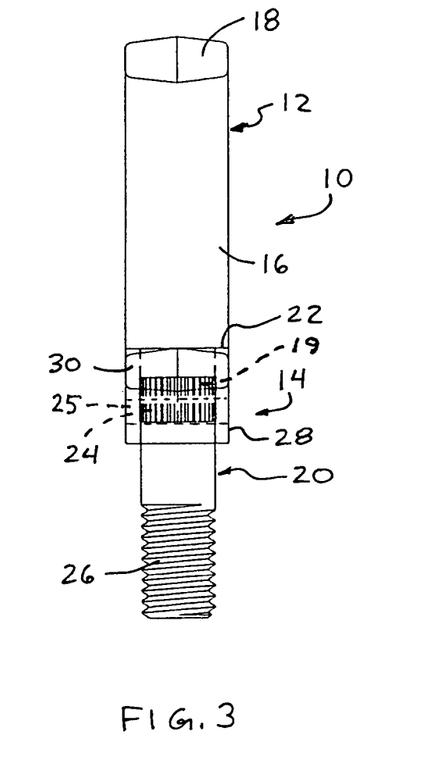
FIG. 3 is another side elevation of the pin assembly of FIGS. 1 and 2.
Figure 4:
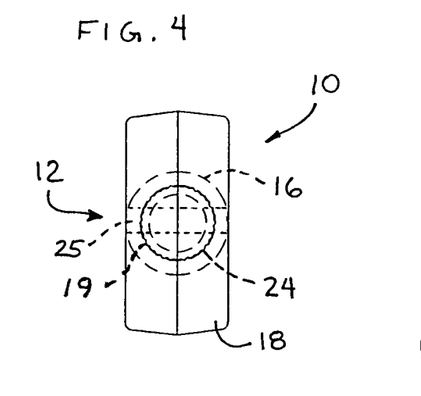
FIG. 4 is a top plan view of the pin assembly of FIGS. 1-3.
Figures 5, 6, 7, 8:
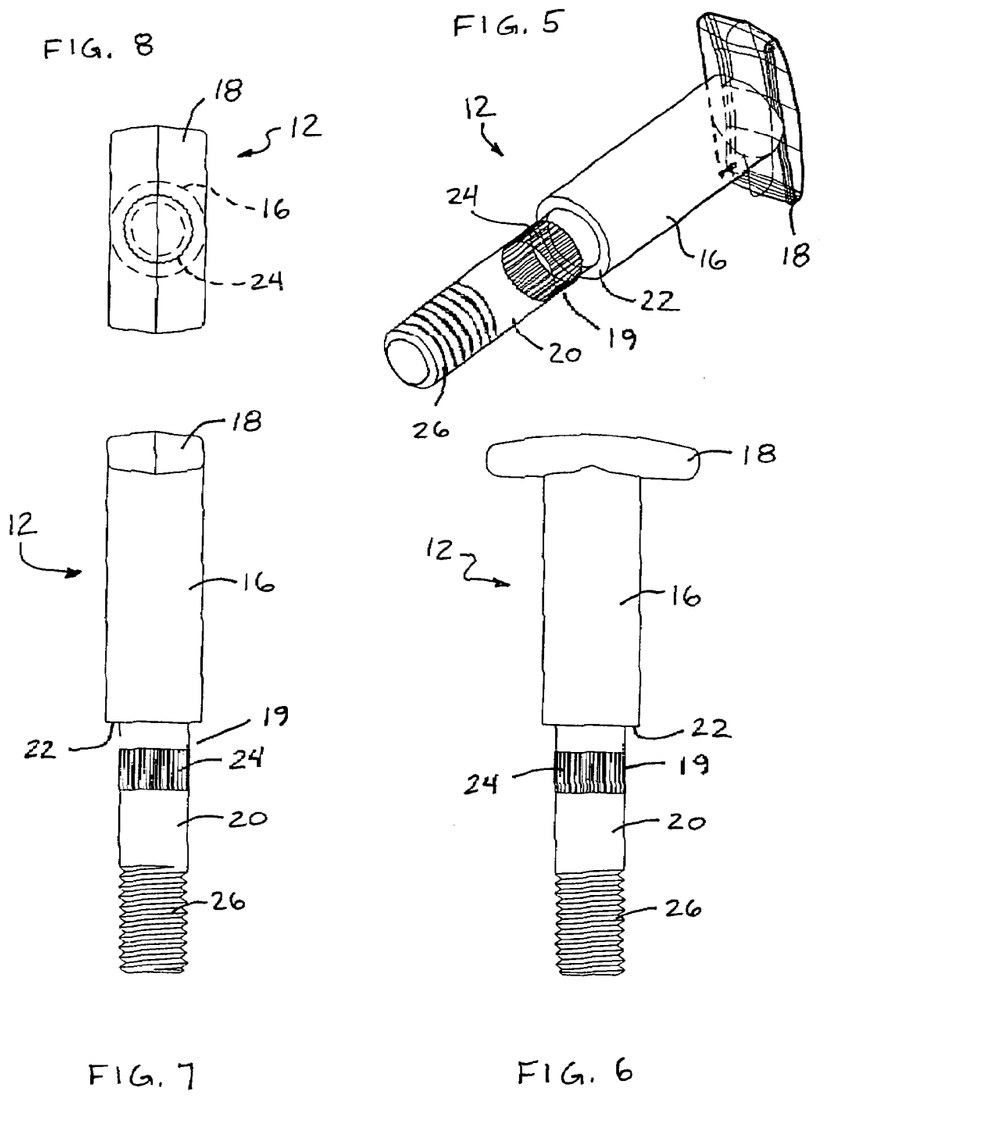
FIG. 5 is a perspective view of a pin element of the pin assembly of the present invention.
FIG. 6 is a side elevation of the pin element of FIG. 5.
FIG. 7 is another side elevation of the pin element of FIGS. 5 and 6.
FIG. 8 is a top plan view of the pin element of FIGS. 5-7.
Figure 9:
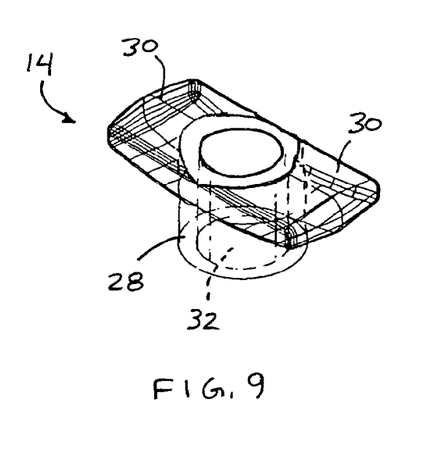
FIG. 9 is a perspective view of a head portion of the pin assembly of the present invention.
Figure 10:
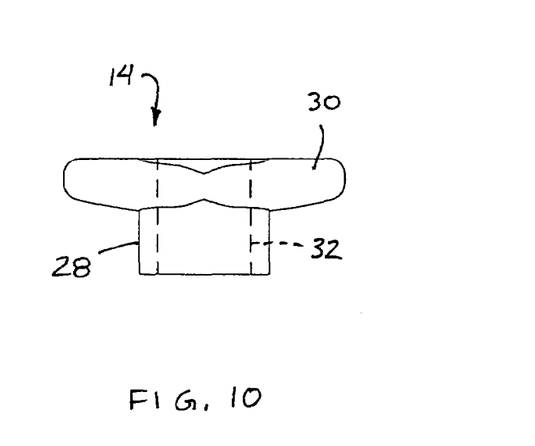
FIG. 10 is a side elevation of the head portion of FIG. 9.
Figure 11:
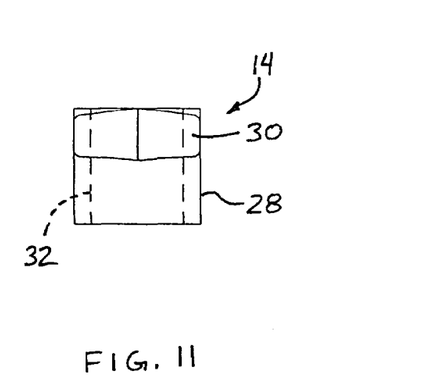
FIG. 11 is another side elevation of the head portion of FIGS. 9 and 10.
Figure 12:
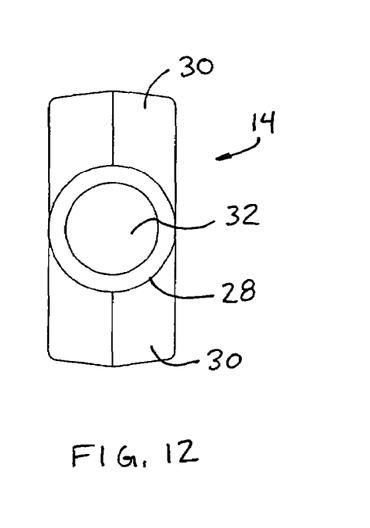
FIG. 12 is a bottom plan view of the head portion of FIGS. 9-11.
Figure 13:
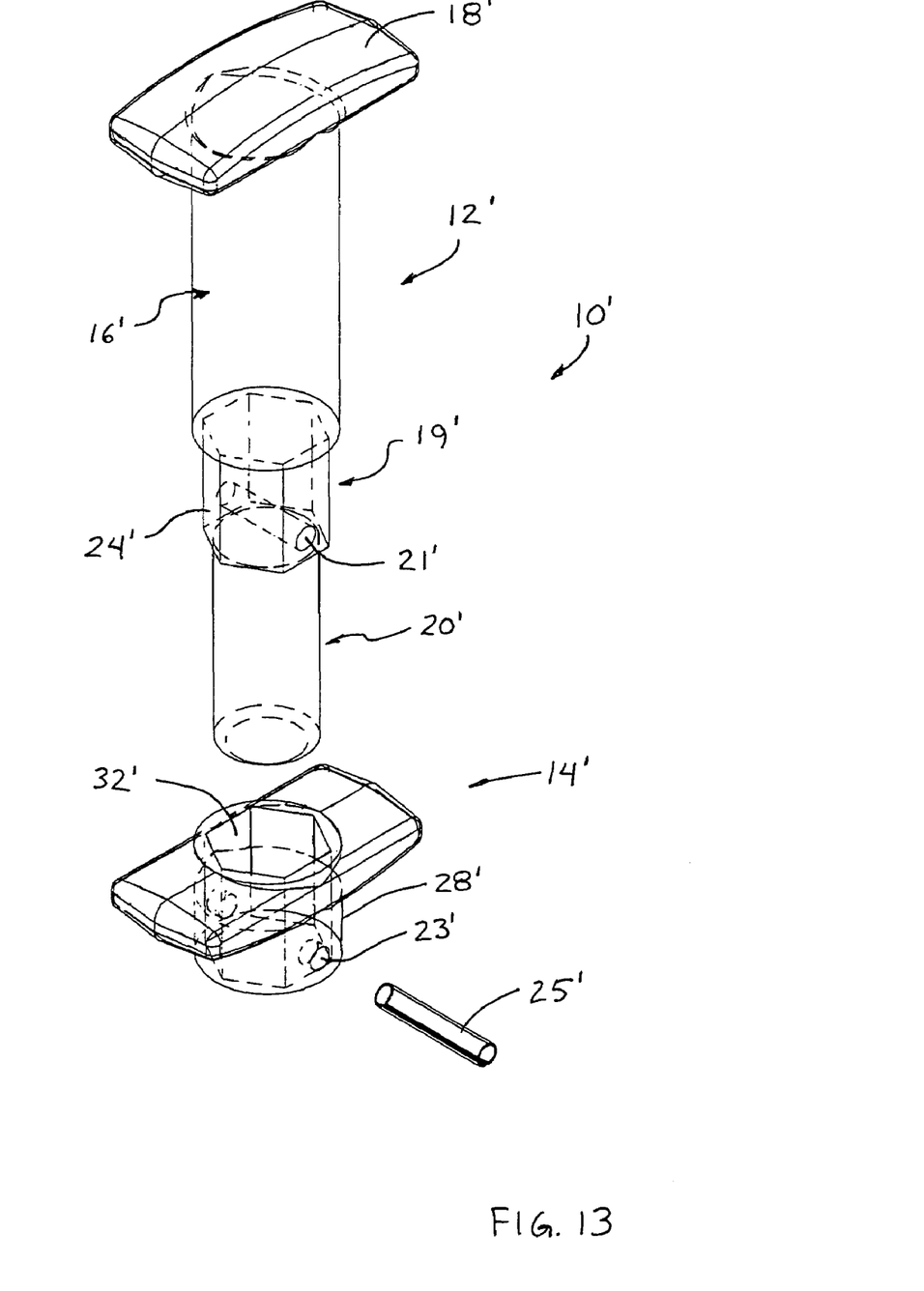
FIG. 13 is an exploded perspective view of another pin assembly in accordance with the present invention.
Figure 14:
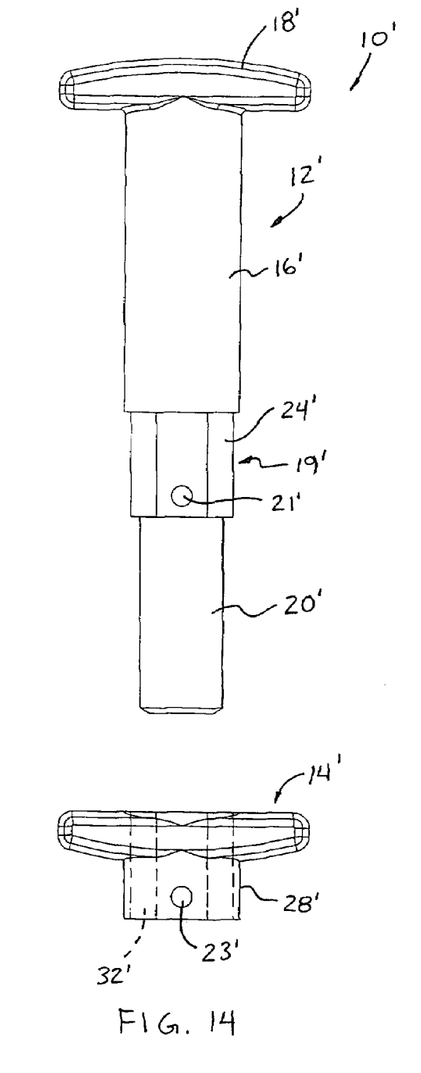
FIG. 14 is an exploded side elevation of the pin assembly of FIG. 13.
Figure 15:
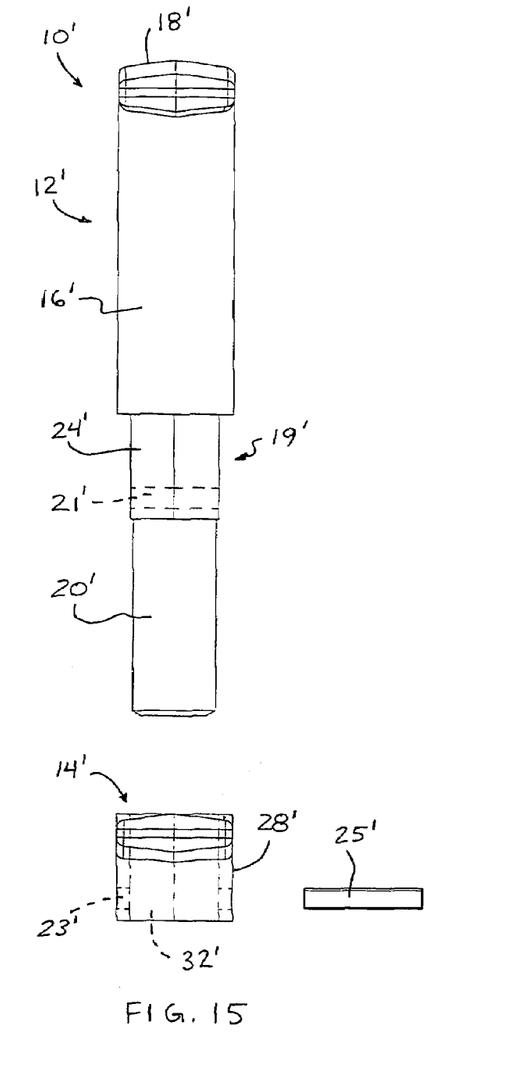
FIG. 15 is another exploded side elevation of the pin assembly of FIGS. 13 and 14.
Figure 16:
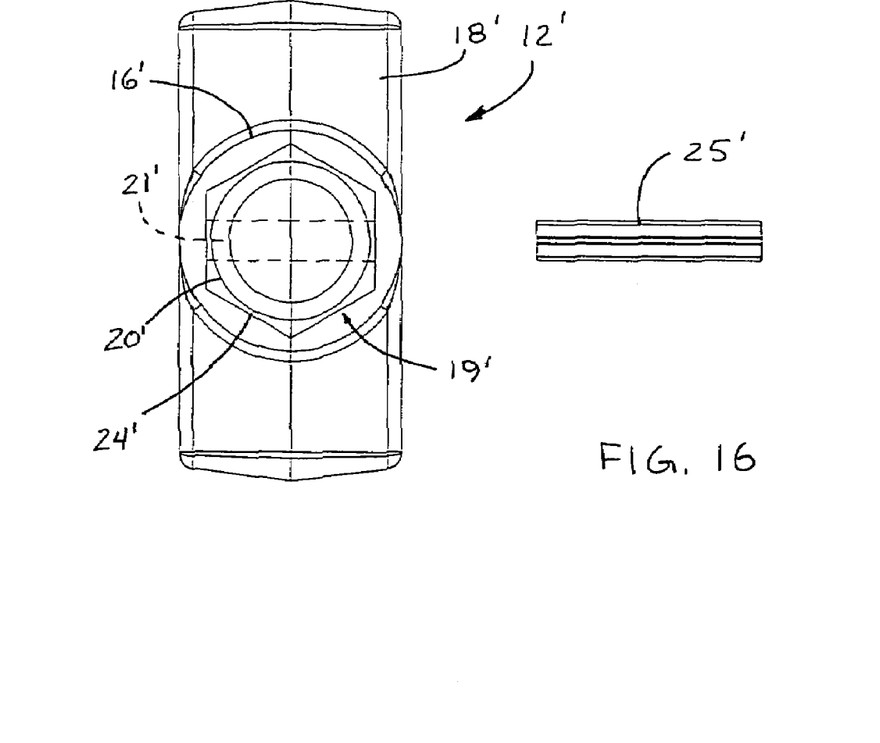
FIG. 16 is an end view of the pin element of the pin assembly of FIGS. 13-15.
Figure 17:
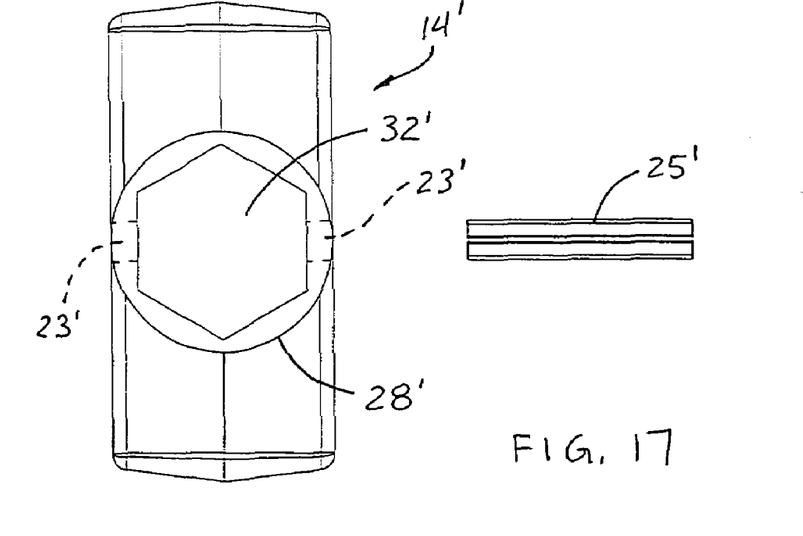
FIG. 17 is an end view of the head portion of the pin element of FIGS. 13-15.
Figure 18:
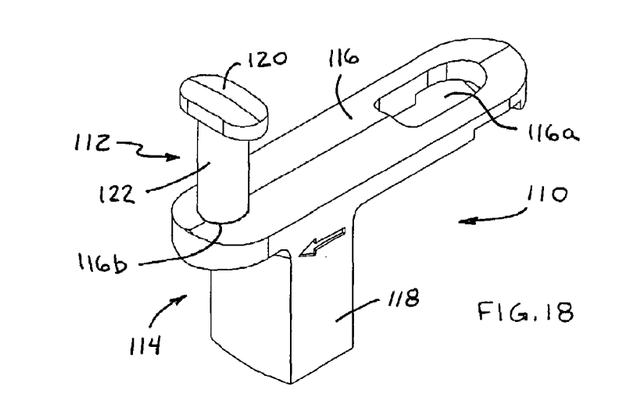
FIG. 18 is a perspective view of another pin assembly in accordance with the present invention.
Figure 19:
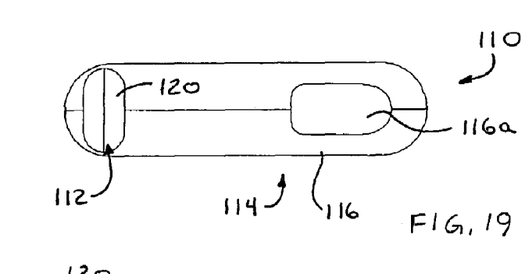
FIG. 19 is a top plan view of the pin assembly of FIG. 18.
Figure 20:
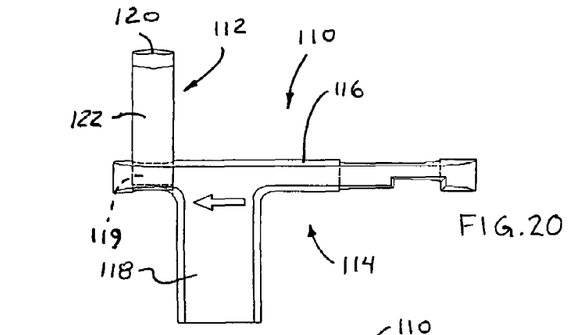
FIG. 20 is a side elevation of the pin assembly of FIGS. 18 and 19.
Figure 21:
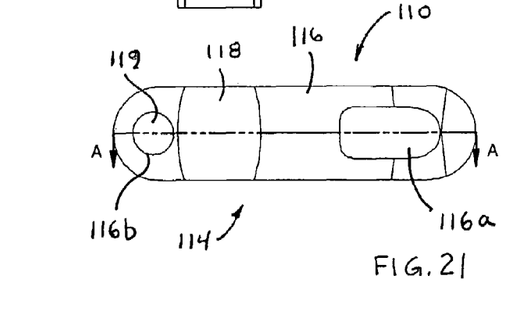
FIG. 21 is a bottom plan view of the pin assembly of FIGS. 18-20.
Figure 22:
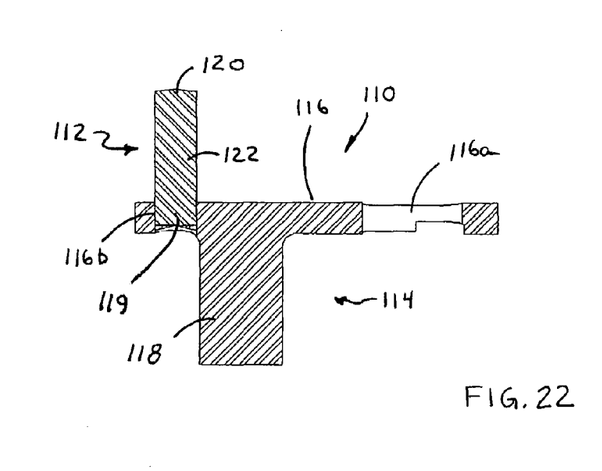
FIG. 22 is a sectional view of the pin assembly, taken along the line A-A in FIG. 21.

As best shown in FIGS. 5-8, shaft portion 16 of pin element 12 comprises a generally cylindrical shaft portion 16 and extends from head portion 18. Attachment portion 19 and extension 20 extend longitudinally from the opposite end of shaft portion 16 and outward and away from head portion 18. As can be seen in FIGS. 5-7, shaft portion 16 has a diameter that is larger than the diameter of the attachment portion 19 and extension 20, such that pin body 12 includes an annular surface or step 22 at the junction of the shaft portion 16 and attachment portion 19. Although shown and described as having a substantially cylindrical shaft portion, the shaft portion may be otherwise formed or may have an sleeve or the like attached thereto, such as by utilizing aspects of the conveyor pins described in U.S. patent application Ser. No. 10/383,825, filed Mar. 7, 2003 by Frost for CONVEYOR CHAIN, now U.S. Pat. No. 6,991,094; and/or Ser. No. 10/969,825, filed Oct. 21, 2004 by Frost et al. for CONVEYOR CHAIN, now U.S. Pat. No. 7,246,699, which are hereby incorporated herein by reference in their entireties.

Optionally, and desirably, attachment portion 19 may include a plurality of retaining elements 24, such as ridges or knurls or the like formed around its outer surface, and is positioned generally between the end of the shaft portion 16 and the extension 20 for retaining the head element 14 on pin element 12, as discussed below. The attachment portion 19 is thus positioned at the end of the shaft portion and at a location that locates the head element 14 at the appropriate or desired distance from the head portion 18 to define an I-type pin when the head element 14 is attached to attachment portion 19.

Optionally, the head element 14 may be retained to or secured to the pin element 12 via a substantially secure or fixed retaining structure or member 25 (FIGS. 3 and 4), such as a retaining pin or spring pin or dowel or peg or cotter pin or set screw or the like. The head element thus may receive the shaft portion of the pin element until an aperture at least partially through the head element is generally aligned with a corresponding aperture at least partially through the shaft portion, whereby a retaining member 25 may be inserted through the apertures to substantially positively secure the head element to the pin element. Other types or forms of attaching pins or members or the like may be implemented, without affecting the scope of the present invention.

Extension 20 of pin element 12 extends from attachment portion 19 and thus extends outwardly from head element 14 when the head element is attached to the attachment portion. Extension 20 may also include a mounting or attaching element or portion 26 at its free or distal end (the end opposite the step or collar 22) for mounting an object or accessory to the pin assembly. In the illustrated embodiment, the mounting portion 26 comprises a threaded end or mount. The threaded mounting portion 26 may be threaded into a threaded passageway of an object or accessory or may be attached to an object or accessory via a female fastener or nut or the like, such as is known in the conveyor chain arts. Other attachment or mounting means may be formed at the end of the extension without affecting the scope of the present invention.

As best shown in FIGS. 9-12, attachment or head portion or element 14 comprises a generally cylindrical base portion 28 and flared or flanged heads or lobes 30 that extend radially outward in opposite directions from base portion 28. Head element 14 includes a generally cylindrical passageway 32 therethrough. The passageway 32 is dimensioned so as to receive extension 20 of pin element 12 therethrough, so that the head element 14 may be slid or moved along the extension 20 and onto attachment portion 19 and to or adjacent to the junction of the shaft portion 16 and the attachment portion 19.

When head element 14 is attached to pin element 12, the head element 14 may be moved or pressed along extension 20 and attachment portion 19 and against the step or collar 22 at the junction, and may be substantially retained in the head position via the retaining elements or knurls 24 via a press fit engagement of the cylindrical portion 28 and the retaining elements 24 of the attachment portion 19 of pin element 12. Although shown and described as knurls on the attachment portion of the pin element, the retaining elements or retaining means may comprise other means for retaining the head element to the pin element at the desired location, without affecting the scope of the present invention. For example, the retaining means may comprise ridges or projections or knurls at or along the surface of the passageway of the head element, or may comprise a pin or stake or the like for retaining the head element in place along the pin element, or may comprise welding or adhering the head element to the pin element, without affecting the scope of the present invention. Optionally, the retaining element and attachment portion may comprise a non-cylindrical shaped cross section, whereby the non-cylindrical shaped cross section attachment portion is received within a correspondingly formed opening or passageway in the head element to non-rotatably retain the head element to the pin element, such as discussed below with respect to the pin assembly 10' of FIGS. 13-17. When positioned and retained at the collar 22, the head element 14 is spaced an appropriate distance from the head portion 18 of the pin element 12, so that the head portion 18, shaft portion 16 and head element 14 define an I-type pin assembly (having opposite head elements or portions) for use with the chain links for the particular application of the pin assembly.

Pin element 12 and/or head element 14 is/are preferably formed so as to have reduced surface irregularities as compared to forged pins and the like. Desirably, the pin element may be formed via a cold forming process, where the shaft portion 16, head portion 18, attachment portion 19 and extension 20 are unitarily formed, such as by utilizing aspects described in U.S. Pat. Nos. 5,365,765 and 5,378,205, which are hereby incorporated herein by reference in their entireties. The pin element thus may have a substantially smooth exterior surface and may have enhanced material properties as a result of such a cold forming process. For example, the pin element may have greater strength due to the grain structure of the pin element material extending generally parallel and longitudinally along the pin element, and may have substantially consistent enhanced surface finish, since cold-formed parts typically have surface finishes that substantially mirror the smooth condition and dimensions of the dies (which often obviates the need for secondary finishing processes), and may have tighter tolerances over forged components. Also, by forming the components via a cold forming process, a reduction of material scrap/waste and process time may be achieved. The head element 14 preferably is also formed in a similar manner to achieve such desired qualities for the head element as well.

Such a cold forming process is not suitable for forming a unitary I-pin and extension due to the second head portion of the I-pin being at a location along the pin and inward of the ends of the pin (with the shaft portion extending from the head portion in one direction and the extension extending from the head portion in the other direction). Thus, known unitary I-pins and extensions/attachment portions are formed via a forging process, which results in a rough surface as compared to components formed by a cold forming process.

Optionally, the retaining elements for retaining the head portion to the pin element may comprise a non-circular shape of the shaft of the pin element and of the passageway of the head portion to limit or substantially preclude rotational movement of the head portion on the pin element. For example, and with reference to FIGS. 13-17, a pin assembly 10' for a chain or section of chain for conveying product along a conveying system, such as for material handling or processing systems or the like, includes a pin body or body portion or pin element 12' and an attachment or attachment element, such as a head portion or element 14'. Pin element 12' includes a shaft portion 16', a pin head or head element or portion 18' at an end of the shaft portion 16', and an attachment portion 19' at the other end of the shaft portion. Pin element 12' also includes an extension or extension member or portion 20' extending from the attachment portion 19' at the end of the shaft portion 16'. Similar to pin assembly 10, discussed above, pin element 12' of pin assembly 10' is formed separately from head element 14', and head element 14' is positioned on pin element 12' to assemble the pin assembly 10', as discussed below. Pin element 12' and/or head element 14' may be formed to have reduced surface irregularities, such as via a cold forming process or the like, so that the exterior surfaces of the pin element 12' and/or head element 14' may be substantially smooth as compared to the roughened surfaces of conventional forged pins.

In the illustrated embodiment of FIGS. 13-17, attachment portion 19' comprises a hexagonal-shaped retaining element or portion 24' generally between the end of the shaft portion 16' and the extension 20', while head element 14' has a hexagonal-shaped passageway 32' therethrough for receiving hexagonal-shaped retaining portion 24' to non-rotatably retain head element 14' on pin element 12' at a location that locates the head element 14' at the appropriate or desired distance from the head portion 18' to define an I-type pin when the head element is attached to attachment portion 19'. The cross dimension of the hexagonal-shaped retaining element or portion 24' is larger than the diameter of the extension 20' so that the extension 20' may freely pass through the passageway 32' in head element 14', while the hexagonal-shaped retaining element 24' may generally correspond to the cross dimension of the passageway 32' or may have an interference fit or press fit with the passageway 32' to assist in retaining the head element 14' on the pin element 12'.

In the illustrated embodiment of FIGS. 13-17, pin assembly 10' includes a retaining element or pin 25' (such as a spring pin or dowel or peg or cotter pin or set screw or the like) that is inserted through an opening or passageway 23' of the base portion 28' of head element 14' and through an opening or passageway 21' of pin element 12' to retain or secure head element 14' to pin element 12' when the head element 14' is positioned at the retaining portion 24' of pin element 12'. The head element thus may receive the shaft portion of the pin element until passageway 23' (which extends through or at least partially through head element 14') is generally aligned with the corresponding passageway 21' (which extends through or at least partially through the shaft portion of pin element 12'). When so positioned or aligned, the pin or retaining element 25' may be inserted through the passageways to substantially positively secure the head element relative to the pin element. The pin 25' may be press fit within the passageways 21', 23' to substantially retain the pin within the passageways, or the pin may otherwise be retained within the passageways, such as be bending the ends of the pin (such as like a cotter pin or the like) or such as by gluing or adhering or welding the pin in place (or such as by threading the pin into a threaded passageway or the like), in order to limit or substantially preclude the pin from being retracted from the passageways during operation of the chain and conveyor system. Other types or forms of attaching pins or members or the like may be implemented, without affecting the scope of the present invention.

Although shown and described as having a hexagonal-shaped retaining portion and passageway, the non-circular retaining portion of the pin element and non-circular passageway of the head element may comprise other shapes, such as other non-circular shapes that limit or substantially preclude rotation of the head element about the pin element so that the lobes of the head element remain substantially aligned with the lobes of the head portion of the pin element to define an I-pin or the like. Optionally, the retaining portion of the pin element and the passageway of the head element may have circular cross sectional dimensions, whereby the retention of the head element on the pin element may be via a press fit engagement between the head element and the retaining portion of the pin element or via a retaining element or pin or the like that engages the head element and pin element to retain the head element to the pin element.

Pin assembly 10' may otherwise be substantially similar to pin assembly 10, such that a detailed discussion of the pin assemblies will not be repeated herein. Briefly, extension 20' extends from attachment portion 19' and thus extends outwardly from head element 14' when the head element is attached to the attachment portion, and may include a mounting or attaching element or portion 26' at its free or distal end (the end opposite the step or collar 22') for mounting an object or accessory to the pin assembly. The mounting portion 26' may comprise a threaded end or mount or may comprise other forms to facilitate attachment to an object or accessory or the like, such as via a female fastener or nut or the like, such as is known in the conveyor chain arts. Other attachment or mounting means may be formed at the end of the extension without affecting the scope of the present invention.

Optionally, and with reference to FIGS. 18-22, a pin assembly 110 may include a pin body or portion or element 112 and an attachment 114, such as a side link and pusher member or "pusher-dog". The side link and pusher member 114 includes a side link portion 116 and a pusher member or portion 118. The pusher member or portion 118 extends downward or outward from the side link and may engage a trolley or the like for pushing or moving the trolley along a conveying path, such as in a similar manner as is known in the conveying arts. The pin element 112 includes an attachment portion 119 for attaching to side link portion 116 of side link and pusher member 114, as discussed below.

Side link portion 116 of side link and pusher member 114 is formed with an opening 116a at one end for receiving a head of a pin to secure the side link to another side link in a known manner. The opening 116a may comprise an elongated opening or slot for receiving a head of an I-pin therethrough, whereby the pin may be rotated so that the lobes of the head of the pin are generally transverse to the slot, such as in a similar manner as is known in the conveying art. The other end of the side link portion 116 includes an opening or aperture 116b for receiving and retaining pin element 112 therein, such as in a similar manner as head element 14 receives extension 20, and as further discussed below. The opening or aperture 116b may comprise a generally cylindrical opening or passageway for receiving the pin element therein.

Pin element 112 includes a head portion 120 and a shaft portion 122 extending from head portion 120. Head portion 120 may be formed with sidewardly extending lobes, similar to a head portion of a known or typical I-pin. Shaft portion 122 is a generally cylindrical shaft portion that has an exposed or central or center link engaging portion (which engages a center link of the chain section when the chain is assembled together). Pin element 112 includes the attachment portion 119, which is received within and at least partially through aperture 116b in side link portion 116 of side link and pusher member 114. Desirably, attachment portion 119 of pin element 112 and/or the walls of aperture 116b include retaining elements (not shown in FIGS. 18-22), such as ridges or knurls or the like, for retaining the shaft end or attachment portion relative to the side link portion when the pin element is inserted into the aperture in the side link portion. Optionally, other retaining means, such as welding or adhering or pinning or staking of the pin element to the side link portion, may be implemented, without affecting the scope of the present invention.

In the illustrated embodiment, the attachment portion 119 extends substantially into and through the aperture 116b in side link portion 116. However, the aperture or passageway may not extend entirely through the side link portion and/or the attachment portion may not extend substantially or entirely along the aperture or passageway (for example, the attachment portion may be threaded into a threaded passageway in the side link and/or the attachment portion may be inserted partially into an opening in the side link and may be welded or otherwise secured therein), without affecting the scope of the present invention.

Optionally, the side link portion of the side link and pusher member and the attachment portion of the pin element may include a passageway at least partially therethrough for receiving a pin or dowel or set screw or the like at least partially therethrough to retain the pin element to the side link and pusher member, such as in a similar manner as described above.

The term "dog" or "pusher-dog" is a term commonly used in the art to describe or indicate a pusher member or element that extends from a side link portion and that has a pin portion extending from the side link portion opposite the pusher member. Pusher members (commonly referred to as "dogs" or "pusher-dogs") are known in the art and typically are unitarily formed to include the side link portion, the pusher member portion and the pin portion. Known pusher-dogs are unitarily formed with the pin portion because the pusher member or portion of the pusher-dog is typically positioned at an end (such as a forward end) of the side link and, thus, interferes with the area where an elongated slot (such as for receiving the oblong head of an I-pin) may be formed. By unitarily forming the pusher-dog with the pin portion extending from the side link portion, the pusher member may be positioned toward the end of the side link portion, without adverse affects on attaching or inserting an I-pin into the side link.

However, because such known pusher-dogs are unitarily forged or formed, the pin portion cannot be cold-formed or otherwise formed or processed to have reduced surface irregularities. In stark contrast to such known pusher-dogs, the pin assembly of the present invention can provide a smooth pin element (that may be separately cold-formed or otherwise formed or processed to have reduced surface irregularities, such as described above) that may be inserted into and retained at the attachment or side link and pusher member, thereby providing a substantially smooth pin at a pusher-dog or side link and pusher member. The other pin for retaining the side link portion of the pusher-dog to another side link may comprise an I-pin (or other type of pin, such as a bolted type pin or stud type pin or the like) of typical or known form or shape and surface characteristics.

Although shown and described as a cylindrical end portion that is received within a cylindrical aperture in the side link portion, the attachment portion of the pin element may be otherwise formed (and may be formed to have a different cross section than the exposed or central shaft portion of the pin element), with the aperture in the side link portion being correspondingly formed to receive the attachment portion therein. For example, the attachment portion may have a different diameter (such as a smaller or reduced diameter) than the diameter of the shaft portion of the pin element that is exposed for engaging a center link when the chain links are assembled together. The shaft portion thus may provide a step or stop or annular surface to limit insertion of the pin element into the side link portion, such as in a similar manner as the pin and head elements described above. Optionally, the attachment portion of the pin element may be formed to have a non-circular cross section, with the aperture in the side link portion being formed to have a similar non-circular cross section, such that the attachment portion may be inserted into the aperture and may be substantially non-rotatably received therein.

Therefore, the present invention provides an I-pin (or other type of pin) that has a head portion at one end and a shaft portion extending from the head portion, and that is configured to attach to an attachment, such as a separately formed head element or a side link and pusher-dog member or the like. The attachment may be formed to have an opening or aperture or passageway at least partially therethrough for at least partially receiving an attachment portion of the pin element (such as an attachment portion at or near an end of the shaft portion of the pin element). The pin element may be formed with a substantially smooth surface as compared to forged pins. The pin assembly of the present invention thus may include a cold formed body portion or pin element that receives or attaches to a cold formed head element or portion to assemble the pin assembly together, and may have an extension extending longitudinally from the head element. Optionally, the pin assembly may have a cold-formed pin element that is received in a side link of a pusher member or pusher-dog and retained therein to assemble the pin assembly together. The two-piece construction of the pin assembly of the present invention allows the pin element (having a head portion and a shaft portion) to be formed with substantially smooth components and structurally enhanced components as compared to conventional forgings, while the attachment (such as a second head portion or element or a side link and pusher member or the like) may be readily attached to and retained at or near the end of the shaft portion of the pin element. The two piece construction may also allow for elements of the pin and/or pusher dog and/or the like to be removed from the chain and thus may facilitate replacement of worn components and/or recycling of various elements or components of the chain and pin and pusher dog assembly.

Changes and modifications in the specifically described embodiments may be carried out without departing from the principles of the present invention, which is intended to be limited only by the scope of the appended claims, as interpreted according to the principles of patent law.

The embodiments of the invention in which an exclusive property or privilege is claimed are defined as follows:

1. A pin assembly for a chain of a material handling system, said pin assembly comprising:

a pin element comprising a shaft portion and a first head portion at an end of said shaft portion, said pin element having an attachment portion extending longitudinally from an end of said shaft portion opposite said first head portion;

a second head portion configured to attach to said attachment portion of said pin element to define an I-type pin having opposite head portions with said shaft portion disposed therebetween, said second head portion being positionable at said attachment portion and being non-rotatably retainable thereto; and wherein said pin element comprises an extension extending longitudinally from said attachment portion and longitudinally from said second head portion when said second head portion is attached to said attachment portion, wherein said extension includes a mounting element at an end of said extension for mounting an accessory to said pin element.

2. The pin assembly of claim 1, wherein said mounting element comprises a plurality of threads at an end of said extension and wherein the accessory is threadedly mounted to said threaded mounting element.

3. The pin assembly of claim 1, wherein said attachment portion includes at least one retaining element formed thereon for retaining said second head portion at an appropriate location along said attachment portion.

4. The pin assembly of claim 3, wherein said at least one retaining element comprises a plurality of ridges on the exterior surface of said attachment portion, said second head portion being press fit over and around said attachment portion at said ridges to substantially retain said second head portion on said attachment portion.

5. The pin assembly of claim 1, wherein said second head portion includes a passageway formed at least partially therethrough, said attachment portion being insertable at least partially into said passageway to position said second head portion at said attachment portion.

6. The pin assembly of claim 5, wherein said shaft portion has a diameter that is greater than the diameter of said attachment portion of said pin element to limit movement of said second head portion along said attachment portion toward said first head portion.

7. The pin assembly of claim 1, wherein said pin element is formed via a cold forming process.

8. The pin assembly of claim 1, wherein said second head portion is formed via a cold forming process.

9. A chain assembly for a chain of a material handling system, said chain assembly comprising:
a pin element comprising a shaft portion and a head portion at an end of said shaft portion, said pin element having an attachment portion extending longitudinally from an end of said shaft portion opposite said head portion;
an attachment element configured to attach to said attachment portion of said pin element, wherein said shaft portion is disposed between said head portion and said attachment element when said attachment element is attached to said attachment portion, and wherein said attachment element comprises a side link portion and pusher member portion;
wherein said side link portion includes a first aperture for receiving said attachment portion of said pin element and a second aperture at or near an end of said side link portion opposite said first aperture, wherein said attachment portion of said pin element is received in said first aperture of said side link portion when said attachment element is attached to said attachment portion of said pin element, and wherein said second aperture of said side link portion receives a portion of a second pin element of said chain assembly; and
wherein said first aperture has a cross-sectional size and shape that generally corresponds to the size and shape of said attachment portion, whereby said attachment portion is at least one of (a) press fit into said first aperture to attach said attachment portion of said pin element to said side link portion of said attachment element, (b) threaded into a threaded portion of said first aperture to attach said attachment portion of said pin element to said side link portion of said attachment element, (c) received in said first aperture arid one of (i) welded therein and (ii) adhered therein to attach said attachment portion of said pin element to said side link portion of said attachment element, and (d) received in said first aperture and one of (i) pinned relative to said side link portion and (ii) staked relative to said side link portion to attach said attachment portion of said pin element to said side link portion of said attachment element.

10. The chain assembly of claim 9, wherein said side link portion and pusher member portion of said attachment element are unitarily formed.

11. The chain assembly of claim 9, wherein said pin element is formed via a cold forming process.

12. The chain assembly of claim 9, wherein said pusher member portion is disposed between said first aperture and said second aperture of said side link portion.

13. The chain assembly of claim 9, wherein said second pin element comprises an I-type pin and wherein said second aperture is configured to receive a head portion of said hype pin therethrough and to non-rotatably retain said head portion of said I-type pin when said I-type pin is received through said second aperture.

14. The chain assembly of claim 9, wherein said pusher member portion is disposed at said side link and rearward of said attachment portion with respect to a direction of travel of said chain assembly along a conveying path of the chain of the material handling system.

15. The chain assembly of claim 9, wherein said attachment portion is press fit into said first aperture to fixedly and non-rotatably attach said attachment portion of said pin element to said side link portion of said attachment element.

16. A method of forming a pin assembly for a chain of a material handling system, said method comprising:
forming a pin element, said pin element comprising a shaft portion and a head portion at a first end of said shaft portion, said pin element including an attachment portion at a second end of said shaft portion opposite said first end, said attachment portion extending longitudinally from said second end of said shaft portion;
forming an attachment element, wherein forming an attachment element comprises forming a side link and pusher member, said side link having a passageway formed at least partially therethrough;
inserting said attachment portion of said pin element at least partially into said passageway of said side link;
retaining said side link at said attachment portion; and
wherein retaining said side link at said attachment portion comprises at least one of (a) press fitting said attachment portion into said first aperture, (b) threading said attachment portion into a threaded portion of said first aperture, (c) receiving said attachment portion in said first aperture and one of (i) welding said attachment portion therein and (ii) adhering said attachment portion therein, and (d) receiving said attachment portion in said first aperture and one of (i) pinning said attachment portion relative to said side link portion and (ii) staking said attachment portion relative to said side link portion.

17. The method of claim 16, wherein forming a side link and pusher member comprises unitarily forming a side link and pusher member.

18. The method of claim 16, wherein forming said pin element includes forming at least one retaining element on said attachment portion, said at least one retaining element functioning to substantially retain said side link at said attachment portion.

19. The method of claim 18, wherein said at least one retaining element comprises a plurality of ridges formed along the exterior surface of said attachment portion, and wherein retaining said side link at said attachment portion comprises press fitting said side link over said ridges formed along the exterior surface of said attachment portion.

20. The method of claim 16, wherein forming a pin element comprises forming a pin element via a cold forming process.

21. The method of claim 16, wherein forming an attachment element comprises forming a side link and pusher member via one of a cold forming process and a forging process.

22. The method of claim 16, wherein forming a pin element comprises forming a pin element so as to provide a substantially smooth wear surface at said shaft portion of said pin element.

* * * * *